(12) United States Patent
Bull (10) Patent No.: US 11,381,266 B1
(45) Date of Patent: Jul. 5, 2022

(54) WIRELESS COMMUNICATION WITH INTERFERENCE MITIGATION

(71) Applicant: IRIDIUM SATELLITE LLC, McLean, VA (US)

(72) Inventor: Jeffrey Francis Bull, Chalfont, PA (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

(21) Appl. No.: 17/138,990

(22) Filed: Dec. 31, 2020

(51) Int. Cl.
*H04B 1/10* (2006.01)
*H01Q 3/36* (2006.01)
*H04B 7/08* (2006.01)

(52) U.S. Cl.
CPC ............... *H04B 1/10* (2013.01); *H01Q 3/36* (2013.01); *H04B 7/086* (2013.01); *H04B 7/0865* (2013.01)

(58) Field of Classification Search
CPC .................................................. H04W 52/243
See application file for complete search history.

(56) References Cited

U.S. PATENT DOCUMENTS

| | | | | |
|---|---|---|---|---|
| 4,837,580 | A * | 6/1989 | Frazita | H04B 1/74 342/372 |
| 4,937,584 | A * | 6/1990 | Gabriel | H01Q 3/2611 342/378 |
| 5,589,958 | A * | 12/1996 | Lieb | E06B 3/6722 312/114 |
| 6,188,373 | B1 * | 2/2001 | Martek | H01Q 21/205 343/893 |
| 8,077,091 | B1 * | 12/2011 | Guigne | G01S 3/48 342/465 |
| 9,252,868 | B1 * | 2/2016 | Bull | H04B 7/18517 |
| 10,651,920 | B1 * | 5/2020 | Struhsaker | H01Q 21/065 |
| 2005/0055479 | A1 * | 3/2005 | Zer | G06F 13/385 710/22 |

(Continued)

OTHER PUBLICATIONS

Complex Signals—Internet Citation—Retrieved on Sep. 20-21, 2021 from http://bme.elektro.dtu.dk/31610/notes/complex.signals. pdf.*

(Continued)

*Primary Examiner* — Berhanu Tadese
(74) *Attorney, Agent, or Firm* — Baker Botts L.L.P.

(57) ABSTRACT

In one implementation, a wireless communications terminal includes a multi-element antenna. In addition, the terminal includes preliminary signal combiners to combine received signals output by corresponding pairs of antenna elements. For each preliminary signal combiner, the signal output by a first of the pair of elements provides a model of interference present in the received signal output by the second of the pair of elements. The preliminary signal combiner is configured to combine the signal output by the first element with the signal output by the second element to produce an initial interference-mitigated signal. The terminal also includes phase shifters to apply complex weights to interference-mitigated signals to produce complex-weighted versions of the interference-mitigated signals and effectively steer a main beam of the antenna to facilitate reception of a desired signal and another signal combiner to combine the complex-weighted versions of the interference-mitigated signals to produce an interference-mitigated output signal.

20 Claims, 4 Drawing Sheets

(56) References Cited

U.S. PATENT DOCUMENTS

| | | | | |
|---|---|---|---|---|
| 2006/0229076 | A1* | 10/2006 | Monk | H04W 16/28 455/442 |
| 2006/0229077 | A1* | 10/2006 | Monk | H04W 36/18 455/442 |
| 2014/0343713 | A1* | 11/2014 | Ziegler | G05B 19/4148 700/214 |
| 2016/0080072 | A1* | 3/2016 | Baudoin | H04W 40/14 370/219 |
| 2016/0087339 | A1* | 3/2016 | Bull | H04W 16/28 342/367 |
| 2017/0353864 | A1* | 12/2017 | Bull | H04L 27/2608 |
| 2017/0353871 | A1* | 12/2017 | Tatum | H04B 7/195 |
| 2018/0013192 | A1* | 1/2018 | Chou | H01Q 3/36 |
| 2018/0019800 | A1* | 1/2018 | Buer | H04B 7/18517 |
| 2018/0041270 | A1* | 2/2018 | Buer | H04W 56/001 |
| 2019/0068277 | A1* | 2/2019 | Xenakis | H04B 7/18543 |
| 2019/0075485 | A1* | 3/2019 | Xenakis | H04W 28/0289 |
| 2019/0109635 | A1* | 4/2019 | Buer | H04B 7/0617 |
| 2019/0216393 | A1* | 7/2019 | Baheti | H01L 23/5384 |
| 2019/0219687 | A1* | 7/2019 | Baheti | A61B 5/02438 |
| 2020/0091608 | A1* | 3/2020 | Alpman | H01Q 25/001 |
| 2020/0310786 | A1* | 10/2020 | Mikhailov | G06F 11/3089 |

OTHER PUBLICATIONS

United States Statutory Invention Registration No. H1005, dated Dec. 3, 1991.

Sophocles J. Orfanidis, "Optimum Signal Processing An Introduction," 1988, http://www.ece.rutgers.edu/~orfanidi/osp2e.

V. John Mathews, et al., "Adaptive Filters," 2003, Chapter 3, pp. 3-48.

T. Bucciarelli, et al., "The Gram-Schmidt Sidelobe Canceller," pp. 18-22.

Lanzi Zhang, et al., "A Wall-Clutter Suppression Method Based on Spatial Signature in Mimo Through-The-Wall Radar Imaging," Progress in Electromagnetics Research B, vol. 55, pp. 277-295, 2013.

* cited by examiner

PRIOR ART

WIRELESS COMMUNICATION WITH INTERFERENCE MITIGATION

TECHNICAL FIELD

The disclosure relates generally to wireless communication, and more specifically to wireless communication with interference mitigation.

SUMMARY

According to one implementation of the disclosure, a wireless communications terminal includes a multi-element antenna. In addition, the terminal includes preliminary signal combiners to combine received signals output by corresponding pairs of antenna elements. For each preliminary signal combiner, the signal output by a first of the pair of elements provides a model of interference present in the received signal output by the second of the pair of elements. The preliminary signal combiner is configured to combine the signal output by the first element with the signal output by the second element to produce an initial interference-mitigated signal. The terminal also includes phase shifters to apply complex weights to interference-mitigated signals to produce complex-weighted versions of the interference-mitigated signals and effectively steer a main beam of the antenna to facilitate reception of a desired signal and another signal combiner to combine the complex-weighted versions of the interference-mitigated signals to produce an interference-mitigated output signal.

According to another implementation of the disclosure, a wireless communications terminal includes an antenna array having a plurality of m antenna elements arranged linearly and displaced from one another such that the displacement between each pair of adjacent antenna elements within the antenna array is substantially equal. In addition, the wireless communications terminal includes a first plurality of m–1 phase shifters. Each such phase shifter of the first plurality is coupled to a unique one of the antenna elements and is configured to receive, from the antenna element to which it is coupled, a signal received by the antenna element and to apply a complex weight to it to generate a complex-weighted version of the signal received by the antenna element. The wireless communications terminal also includes a plurality of m–1 first-stage signal combiners. Each such first-stage signal combiner corresponds to a unique one of the pairs of adjacent antenna elements within the antenna array and is coupled to a first one of the pair of adjacent antenna elements and a phase shifter from the first plurality of phase shifters that is coupled to the second of the pair of adjacent antenna elements. In addition, each such first-stage signal combiner is configured to receive, from the first of the pair of adjacent antenna elements, a signal received by the first antenna element, to receive, from the phase shifter coupled to the second of the pair of adjacent antenna elements, the complex-weighted version of the signal received by the second antenna element, and to combine the signal received by the first antenna element and the complex-weighted version of the signal received by the second antenna element to generate an output signal. The wireless communications terminal further includes a second plurality of m–1 phase shifters. Each such phase shifter of the second plurality is coupled to a unique one of the first-stage signal combiners and is configured to receive, from the first-stage signal combiner to which it is coupled, the output signal output by the first-stage signal combiner and to apply a complex weight to it to generate a complex-weighted version of the output signal. The wireless communications terminal also includes a second-stage signal combiner that is coupled to each of the phase shifters of the second plurality and that is configured to combine the complex-weighted versions of the output signals output by the phase shifters of the second plurality to generate an interference-mitigated output signal for the antenna array. In addition, the wireless communications terminal includes a first controller to set the complex weights applied by the first plurality of phase shifters to the signals received by the antenna elements to which they are connected to generate complex-weighted versions of the signals received by the antenna elements to which they are connected that model interference from a co-located wireless communication terminal, and a second controller to set the complex weights applied by the second plurality of phase shifters to steer a main beam of the antenna array to facilitate reception of a desired signal.

According to yet another implementation of the disclosure, signals are received with an antenna array that has a plurality of m antenna elements that are arranged linearly and displaced from one another such that the displacement between each pair of adjacent antenna elements within the antenna array is substantially equal. In addition, a first set of complex weights to be applied to the signals received by m–1 of the antenna elements is accessed and applied to the signals received by the m–1 antenna elements to generate complex-weighted versions of the corresponding signals received by the m–1 antenna elements. For each pair of adjacent antenna elements within the antenna array, the signal received by a first one of the pair of adjacent antenna elements is combined with the complex-weighted version of the signal received by the second one of the pair of adjacent antenna elements to generate m–1 output signals. A second set of complex weights to apply to the output signals also is accessed and applied to the output signals to generate complex-weighted versions of the output signals. The complex-weighted versions of the output signals then are combined to generate an interference-mitigated output signal.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Satellite communication systems may enable wireless voice and data communications around the world. In some cases, satellite communication systems enable communication in regions where other wireless communication systems may not be available. For example, some wireless communication systems may require terrestrial infrastructure (e.g., a cell tower, a base station, etc.). It may not be possible to communicate using these systems in regions where the necessary terrestrial infrastructure does not exist or cannot be accessed. However, satellite communication systems still may be capable of communicating in such regions. Examples of these regions include the oceans, the airways, the polar regions, and developing and/or underdeveloped nations. Frequently, multiple satellite communication systems may be co-located (e.g., within a fixed relative area). For example, a ship equipped with two or more satellite communication systems may have only a small deck area suitable for installing the antennae for the satellite communication systems and, consequently, the antennae for the satellite communication systems may be forced to be installed in close physical proximity to one another (e.g., within a few feet or yards of one another on the deck). Similarly, an aircraft equipped with two or more satellite communication systems may have limited external area suitable for mounting the antennae for the satellite communications systems. As a result, the antennae for the satellite communication systems may be mounted in close physical proximity to one another.

In some cases, two or more co-located satellite communication systems may use similar, adjacent, neighboring, and/or overlapping frequencies (e.g., for transmit and/or receive functions of satellite communication). As a result, an output signal transmitted by a first satellite communication system may interfere with the ability of a second, co-located satellite communication system to receive an input signal, and vice versa, particularly if the power of the output signal is significantly greater than the power of the input signal. For example, if the first satellite communication system transmits a relatively high-power output signal in a frequency band that is immediately adjacent to the frequency band in which the second satellite communication system receives a relatively low-power input signal, components of the relatively high-power output signal may spill over into the frequency band in which the second satellite communication system receives the low-power input signal and, particularly due to the power difference between the two signals, cause interference with the relatively low-power input signal, thereby degrading the performance of the second satellite communication system. Additionally or alternatively, the presence of the relatively high-power output signal may cause reciprocal mixing in the receiver of the second satellite communication system also resulting in degradation of the second satellite communication system's ability to receive the relatively low-power input signal. Local oscillators with relatively good phase-noise performance may be employed to mitigate the effect of such reciprocal mixing, but such high performance oscillators may be relatively expensive. Application of the interference mitigation techniques described herein may enable the use of potentially cheaper local oscillators with worse phase-noise performance while still providing protection against reciprocal mixing.

In one specific example, an IRIDIUM® satellite terminal that uses L band frequencies between 1616 and 1626.5 megahertz ("MHz") to communicate with IRIDIUM® satellites may be co-located (e.g., on a ship or aircraft) with an INMARSAT® satellite terminal that uses L band frequencies between 1525 and 1646.5 MHz to communicate with one or more INMARSAT® satellites. Consequently, transmissions to/from the INMARSAT® satellite terminal may pose the potential for interference with transmissions to/from the IRIDIUM® satellite terminal and vice versa. For example, the INMARSAT® satellite terminal may transmit communications in a frequency band that is adjacent to a frequency band in which the IRIDIUM® satellite terminal receives transmissions from IRIDIUM® satellites. Accordingly, outbound transmissions from the INMARSAT® satellite terminal may pose the potential to interfere with transmissions received by the IRIDIUM® satellite terminal and/or cause reciprocal mixing in the IRIDIUM® satellite terminal resulting in signal degradation, particularly given the relatively high power of output transmissions from the INMARSAT® satellite terminal required to reach an INMARSAT® satellite and the relatively low power of transmissions received by the IRIDIUM® satellite terminal from an IRIDIUM® satellite. For example, the power ratio of transmissions output by the INMARSAT® satellite terminal to transmissions received by the IRIDIUM® satellite terminal may be on the order of +100 dB or more.

A satellite communication terminal may be configured to mitigate the effects of interference from one or more other satellite communication terminals in the event that the satellite communication terminal is co-located with one or more other satellite communications terminals, for example that use similar, adjacent, neighboring, and/or overlapping frequencies. For instance, a satellite communication terminal configured to receive a signal from one or more satellites even when co-located with another satellite communication terminal that transmits an output signal in a similar, adjacent, neighboring, and/or overlapping frequency band may employ beam steering (e.g., using complex weights, phase shifters, etc.) to steer the main beam of the satellite communication terminal's antenna toward the signal to be received (and, in some cases) away from the interfering signal output by the co-located satellite communication terminal. However, in some cases (e.g., if the power of the interfering signal is significantly greater than the power of the signal to be received), such beam steering alone may not effectively mitigate the interference caused by the signal transmitted by the co-located satellite communication terminal.

Additionally or alternatively, the satellite communication terminal may employ frequency domain filtering techniques (e.g., band pass filtering, for instance, using a surface acoustic wave ("SAW") filter) to mitigate interference caused by the signal transmitted by the co-located satellite communication terminal. However, in some cases (e.g., if the interfering signal is in a similar, adjacent, neighboring, and/or overlapping frequency band and particularly if the power of the interfering signal is significantly greater than the power of the signal to be received), such frequency domain filtering techniques alone may not effectively mitigate the interference caused by the signal transmitted by the co-located satellite communication terminal.

As described herein, implementations of the present disclosure may provide a satellite communication system configured to mitigate the effects of interference from one or more other co-located satellite communication systems. For example, implementations of the present disclosure may utilize a combination of a main antenna or antenna array and an auxiliary antenna or antenna array to receive an interfering signal from a co-located satellite communication system and subtract the interfering signal from the signal received by the main antenna to mitigate the interference caused by the interfering signal to the desired signal. In certain implementations, spatial filtering techniques (e.g., shaping an antenna's transmit/receive response) may be employed to mitigate interference caused by the co-located satellite communication system. For example, the primary antenna may be a steerable antenna (e.g., a switched beam antenna or an adaptive array antenna) configured to steer a beam (e.g., a main beam) of the primary antenna in a direction perceived as advantageous for receiving the desired satellite signal and the auxiliary antenna may be configured to receive the interfering signal from the co-located satellite communication system such that the interfering signal received by the auxiliary antenna can be subtracted from the signal received by the primary antenna to mitigate the effects of the interfering signal received by the primary antenna.

In certain implementations, the gain of such an auxiliary antenna may be relatively low compared to the gain of the primary antenna. Furthermore, complex weights may be applied to the signal received by such an auxiliary antenna to shift the amplitude and/or phase of the signal received by the auxiliary antenna in an effort to optimize the cancellation of the interfering signal from the co-located satellite communication system.

Alternative implementations of the present disclosure may utilize a multielement antenna in which individual elements of the antenna are paired, with a first element of each pair being configured to receive an interfering signal from a co-located satellite communication system such that, when the signal received by the first element of the pair is combined with the signal received with the signal received by the second element of the pair, it cancels or otherwise mitigates the presence of the interfering signal from the co-located satellite communication system in the signal received by the second element of the pair. In some implementations, complex weights may be applied to the interfering signal received by the first antenna element of each pair prior to combining the signal received by the first antenna element with the signal received by the second element so as to reduce the interfering signal as much as possible at each pair. The interference-mitigated signals generated by each pair of antenna elements also may be combined. In some implementations, complex weights may be applied to the interference-mitigated signals before they are combined so as to steer a main beam of the antenna to facilitate reception of the desired signal. Additionally, in some implementations, this architecture can be extended such that pairs of pairs are combined, for example, to mitigate the effect of additional interfering signals and/or to mitigate the effect of distinct components of one or more interfering signals.

Figure 1:
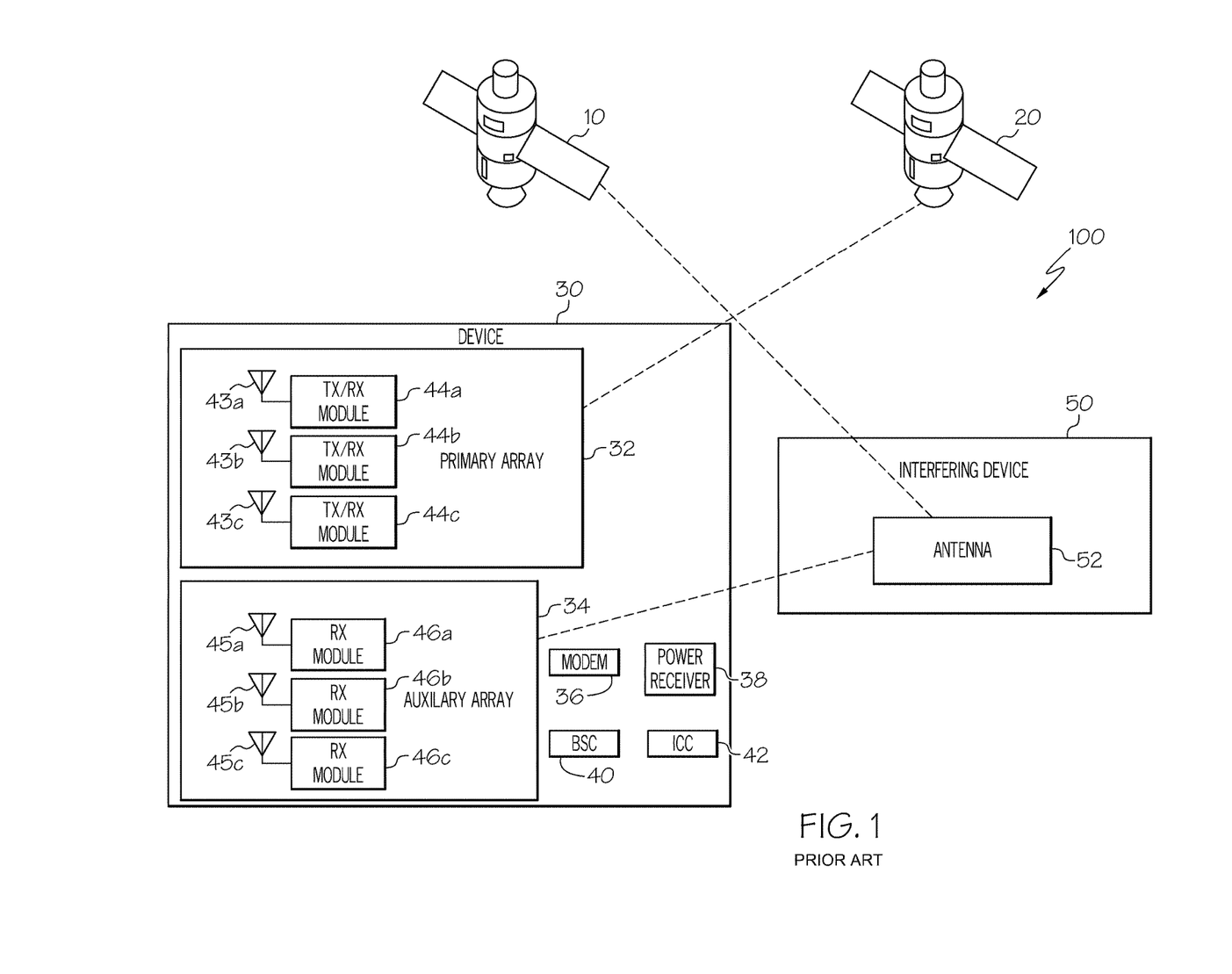
FIG. 1 is a high level block diagram of a system for wireless communication with interference mitigation in accordance with a non-limiting implementation of the present disclosure.

With reference to FIG. 1, a high level block diagram of a system 100 for wireless communication is illustrated in accordance with a non-limiting implementation of the present disclosure. System 100 includes satellites 10 and 20, wireless communication terminal 30 for receiving a signal from satellite 20, and interfering wireless communication terminal 50 for transmitting a signal to satellite 10. Wireless communication terminal 30 includes a primary antenna array 32, an auxiliary antenna array 34, a modem 36, a power receiver 38, a Beam Steering Controller ("BSC") 40, and an Interference Canceller Controller ("ICC") 42. Primary array 32 has one or more antenna elements 43a-c, each of which includes a corresponding transmit/receive module 44a-c. Auxiliary array 34 has one or more antenna elements 45a-c, each of which includes a corresponding receive module 46a-c. For example, primary antenna array 32 may have 12 antenna elements, and auxiliary antenna array 34 may have 3 antenna elements. Primary array 34 may transmit and/or receive signals to satellite 20.

Interfering wireless communication terminal 50 includes one or more antenna elements 52. Antenna elements 52 communicate with satellite 10. When interfering wireless communication terminal 50 is transmitting to satellite 10, antenna 52 may send a relatively high power transmission signal (particularly when compared to the power of the signal that wireless communication terminal 30 receives from satellite 20) from interfering wireless communication terminal 50 to satellite 10. The relatively high power transmission signal sent by interfering wireless communication terminal 50 may be in a similar, adjacent, neighboring and/or overlapping frequency band to a frequency band in which wireless communication terminal 30 is configured to receive signals from satellite 20. Furthermore, wireless communication terminal 30 may be located in close proximity (e.g., less than 5 feet, between 5 and 15 feet, between 15-50 feet, etc.) to interfering wireless communication terminal 50. Thus, the relatively high power transmission signal sent by interfering wireless communication terminal 50 may interfere with the ability of wireless communication terminal 30 to receive the relatively low power signal from satellite 20.

The BSC 40 may be configured to steer a main beam of primary antenna array 32 in a desired direction to facilitate the transmission of signals to and/or the reception of signals from satellite 20. For example, BSC 40 may control complex weights applied by transmit/receive modules 44a-44c to signals transmitted/received by antenna elements 43a-43c to steer a main beam of primary antenna array 32 in the desired direction. However, even with a main beam of primary antenna array 32 positioned to facilitate the reception of the signal from satellite 20, the signal transmitted by interfering wireless communication terminal 50 still may interfere with the ability of wireless communication terminal 30 to receive the signal from satellite 20. For example, even if a main beam of primary antenna array 32 is steered in the direction of satellite 20 (and/or away from interfering wireless communication terminal 50), the signal transmitted by interfering wireless communication terminal 50 still may be received in the side lobe(s) of primary antenna array 32.

Therefore, auxiliary antenna array 34 may be used to sample the signal transmitted by interfering wireless communication terminal 50 so that the sampled interfering signal may be subtracted from the signal received by primary antenna array 32 to produce an interference mitigated signal that thereafter is provided to modem 36. In certain implementations, a main beam of auxiliary antenna array 34 may be steered in a particular direction to facilitate reception of the interfering signal from interfering wireless communication terminal 50. In certain implementations, power receiver 38 may measure the power in the interference mitigated signal, and ICC 42 may control complex weights applied by receive modules 46a-46c to the signals received by antenna elements 45a-45c in an effort to minimize the power in the interference mitigated signal. Furthermore, in certain implementations, the above-described signal processing may be performed at radio frequencies ("RF") (e.g., before the received signal is converted to an intermediate frequency, baseband, etc.).

Figure 2:
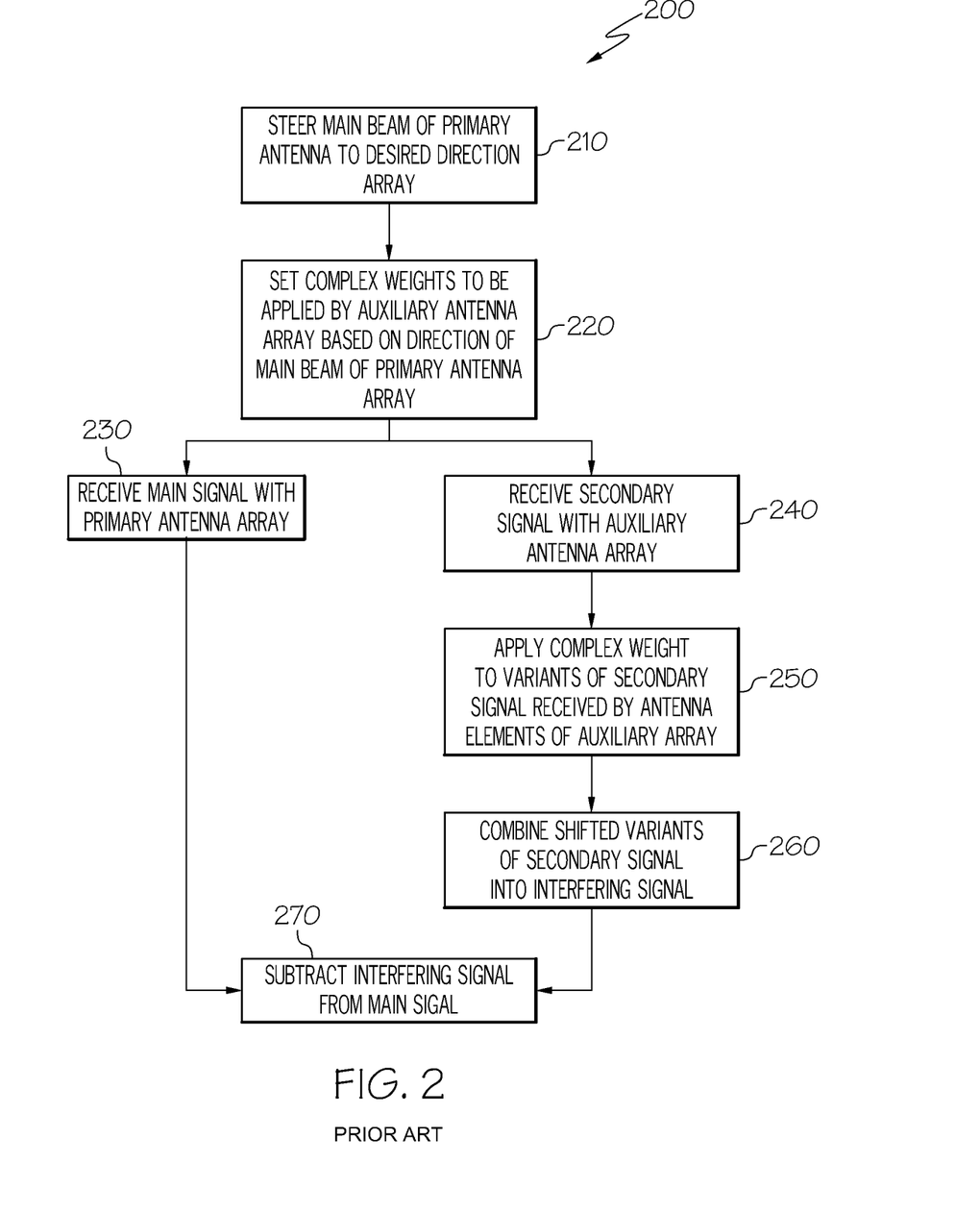
FIG. 2 is a flow chart of a method for wireless communication with interference mitigation in accordance with a non-limiting implementation of the present disclosure.

With reference to FIG. 2, a flow chart 200 of a method for wireless communication with interference mitigation is illustrated in accordance with a non-limiting implementation of the present disclosure. The method illustrated in flow chart 200 may be performed by the wireless communication terminal 30 illustrated in FIG. 1. At step 210, a main beam of a primary antenna array is steered to a desired direction. For example, a desired signal to be received may be transmitted by a satellite orbiting the earth, and a main beam of the primary antenna array may be steered in a direction favorable for receiving the desired signal. In some implementations, a main beam of the antenna array may be steered in the desired direction by defining complex weights to be applied to the signals received by the antenna elements of the primary antenna array. At step 220, complex weights to be applied by the auxiliary antenna array are set based on the direction of the main beam of the primary antenna array. As described in greater detail below, in some implementations, the complex weights to be applied may be calculated substantially in real-time as the main beam of the primary antenna is steered, while, in other implementations, the complex weights to be applied may have been predetermined (e.g., during a calibration process) for each of a number of different possible directions in which the main beam of the primary antenna may be steered.

At step 230, a main signal is received by the primary antenna array. The main signal may include noise from a signal transmitted by another nearby wireless communication terminal. For example, the signal transmitted by the nearby wireless communication terminal may be received in one or more side lobes of the primary antenna array. In some cases, the power of the signal transmitted by the nearby wireless communication terminal may be significantly greater than the power of the signal desired to be received (e.g. +100 dB).

In parallel with receiving the main signal, at step 240, a secondary signal is received with the auxiliary antenna array. The secondary signal received by the auxiliary antenna array may include the signal transmitted by the nearby wireless communication terminal. As such, the auxiliary antenna array may be said to sample the signal transmitted by the nearby wireless communication terminal. In some implementations, the individual antenna elements of the auxiliary antenna array may receive variants (e.g., time- and/or phase-shifted variants) of the second signal. At step 250, the antenna elements of the auxiliary antenna array apply the previously set complex weights to the variants of the secondary signal they received, thereby generating shifted (e.g. phase-shifted) variants of the secondary signal. At step 260, the shifted variants of the secondary signal are combined into an interfering signal (e.g., that models the signal transmitted by the nearby wireless communication terminal).

At step 270, the interfering signal is subtracted from the main signal. Subtracting the interfering signal from the main signal may result in noise (e.g., the signal transmitted by the nearby wireless communication terminal) being canceled or reduced from the main signal to enable further processing of a desired signal included within the main signal. The resulting signal, therefore, may be referred to as an interference mitigated signal.

In some implementations, the power in the interference mitigated signal may be monitored, and the weights to be applied by the antenna elements of the auxiliary antenna array may be calculated to minimize (or at least reduce) the power in the interference mitigated signal. For example, in some particular implementations, a calibration process may be performed upon installation of the device and/or at intervals thereafter to determine appropriate complex weights to be applied by the antenna elements of the auxiliary antenna array to minimize (or at least reduce) the power in the interference mitigated signal for each of a defined number of possible directions in which a main beam of the primary antenna array may be steered. Additionally or alternatively, the power in the interference signal may be measured continually and used as feedback to continually adapt the complex weights applied by the antenna elements of the auxiliary antenna array substantially in real-time.

In some implementations, the desired signal may be transmitted by satellites within a constellation of two or more satellites orbiting the earth. Therefore, the direction of a main beam of the primary antenna array may be changed relatively frequently to account for changes in the position of a particular satellite from which the desired signal is being received as the particular satellite orbits the earth. As the beam of the primary antenna array is steered in this manner, occasionally the main beam of the primary antenna array may be pointed substantially in the direction of the signal being transmitted by the nearby wireless communication terminal. When this occurs, the noise in the main signal caused by the nearby wireless communication terminal may make it difficult or impossible to extract the desired signal from the main signal. Therefore, when it is determined that pointing the main beam of the primary antenna array may subject the primary antenna array to substantial interference from a nearby wireless communication terminal, the main beam of the primary antenna array may be steered in a different direction that is favorable for receiving the desired signal from another one of the satellites in the satellite constellation.

Figure 3:
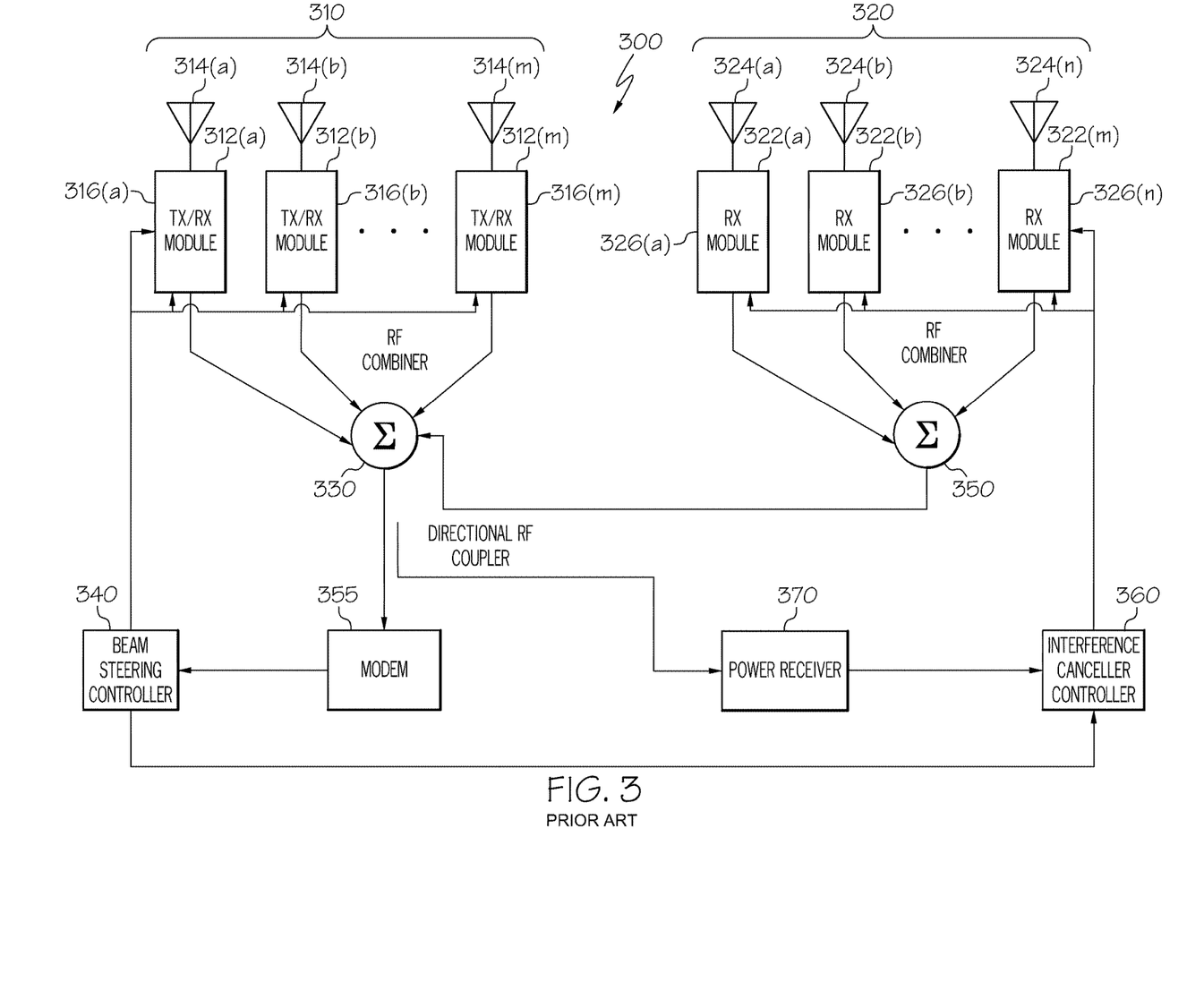
FIG. 3 is a block diagram of a system for wireless communication configured to provide interference mitigation.

With reference to FIG. 3, a block diagram of a wireless communication terminal 300 configured to provide interference mitigation is illustrated in accordance with a non-limiting implementation of the present disclosure. A primary transmit/receive antenna array 310 includes a number of antenna elements $312(a)$-$(m)$. The antenna elements $312(a)$-$(m)$ collectively are configured to transmit and/or receive signals. The primary transmit/receive antenna array 310 may be steerable, for example, to enable one or more main beams of the primary transmit/receive antenna array 310 to be steered in directions that are favorable for transmitting and/or receiving signals. For example, if wireless communication terminal 300 is configured to communicate with one or more satellites, the primary transmit/receive antenna array 310 may be steerable to train a main beam of the primary transmit/receive antenna array 310 in directions favorable for communicating with a target satellite. In some implementations, the antenna elements $312(a)$-$(m)$ may include phase shifters that enable one or more main beams of the primary transmit/receive antenna array 310 to be steered.

In some situations, when operating in a receive mode to receive a desired signal, the primary transmit/receive antenna array 310 may receive interfering signals in its side lobe(s). For example, if the wireless communication terminal 300 is located in close physical proximity to another wireless communication terminal (not shown) that transmits signals in a similar, adjacent, neighboring, and/or overlapping frequency band to the frequency band in which the wireless communication terminal 300 receives signals, the wireless communication terminal 300 may receive signals transmitted by the other wireless communication terminal in its side lobe(s). Although the gain in the side lobe(s) may be low relative to the gain in the main beam, if the power of the interfering signal is high relative to the power of the signal desired to be received, the interfering signal received in the side lobe(s) may degrade and/or interfere with the reception of the desired signal.

An auxiliary receive antenna array 320 includes a number of auxiliary antenna elements $322(a)$-$(n)$. In certain implementations, the number of primary antenna elements $312(a)$-$(m)$ in the primary transmit/receive array 310 may be greater (even significantly greater) than the number of auxiliary antenna elements 322(a)-(n) in the auxiliary receive antenna array 320. The number of antenna elements in each antenna array 310 and 320 may vary depending on the implementation taking into account factors such as, for example, cost, gain required, device form factor, etc.

The primary antenna elements 312(a)-(m) in the primary transmit/receive antenna array 310 each may include an antenna 314(a)-(m) and a transmit/receive module 316(a)-(m). Each transmit/receive module 316(a)-(m) may include one or more band pass filters (e.g. for filtering out frequencies outside of the frequency band(s) in which the wireless communication terminal 300 is intended to receive signals), a low noise amplifier (e.g., for amplifying received signals), a transmit power amplifier (e.g., for amplifying signals to be transmitted), radio-frequency switches (e.g., for switching between transmit and receive modes) and/or a phase shifter. The primary antenna elements 312(a)-(m) of the primary transmit/receive antenna array 310 are configured to receive variants of a main signal (e.g., time and/or phase shifted variants of the main signal). The outputs of the primary antenna elements 312(a)-(m) are combined by a radio frequency (RF) combiner 330. Each of these components in the primary transmit/receive antenna array 310 may operate at RF.

BSC 340 is configured to steer a main beam of the primary transmit/receive antenna array 310 in desired directions. For example, BSC 340 may control phase shifters included in the transmit/receive modules 316(a)-316(m) to steer a main beam of the primary transmit/receive antenna array 310.

The auxiliary antenna elements 322(a)-(n) in the auxiliary receive antenna array 320 each may include an antenna 324(a)-(n) and a receive module 326(a)-326(n). Each receive module 326(a)-(n) may include one or more filters (e.g., for filtering out frequencies outside of the frequency bands in which the wireless communication terminal 300 is intended to receive signals), a low noise amplifier (e.g., for amplifying received signals), and a complex weight module for applying complex weights to received signals (e.g., to shift the amplitude and/or phase of the received signals). The auxiliary antenna elements 326(a)-326(n) of the auxiliary receive antenna array 320 are configured to receive variants of a secondary signal (e.g., time and/or phase shifted variants of the secondary signal). The outputs of the auxiliary antenna elements 326(a)-326(n) are combined by an RF combiner 350. Similar to the components of the primary transmit/receive antenna array 310, each of these components of the auxiliary receive antenna array 320 may also operate at RF.

In certain implementations, the auxiliary receive antenna array 320 may be configured to sample an interfering signal. For example, the auxiliary receive antenna array 320 may be configured to sample an interfering signal transmitted by another wireless communication terminal located in close physical proximity to wireless communication terminal 300 that also may be received in the side lobe(s) of the primary transmit/receive antenna array 310. In such cases, the output of RF combiner 350, represents a model of the interfering signal received in the side lobe(s) of the primary transmit/receive antenna array 310 and can be subtracted from the main signal received by the primary transmit/receive antenna array 310 by RF combiner 330 to cancel or mitigate interference in the signal received by the primary transmit/receive antenna array 310. This subtraction may occur at RF. The signal output from RF combiner 330 may be transmitted to modem 355 for further processing by the wireless communication terminal 300. In some implementations, the signal output from RF combiner 330 may be converted to an intermediate frequency (e.g., a frequency lower than RF frequencies) before being transmitted to modem 355.

In certain implementations, ICC 360 controls the complex weights applied to the variants of the secondary signal received by the receive modules 326(a)-326(n) of the auxiliary receive antenna array 320, for example, to minimize (or mitigate) the interference in the signal output by RF combiner 330. The ICC 360 may adjust the complex weights according to an algorithm. For example, power receiver 370 may measure the power in the signal output by RF combiner 330, and the algorithm may be configured to adjust the complex weights applied by the receive modules 326(a)-326(n) to minimize the power measured in the signal output by RF combiner 330. In certain implementations, the power receiver may be implemented as a tuned power meter. Additionally or alternatively, the power receiver may include a power detector that measures power in the bandwidth of the wireless communication terminal 300 at one or more frequencies to which the power detector is tuned.

In certain implementations, BSC 340 may be configured to steer a main beam of primary transmit/receive antenna array 310 to a predetermined number of different positions, and corresponding sets of complex weights to be applied by the receive modules 326(a)-326(n) may be determined for each of the predetermined positions of the main beam of primary transmit/receive antenna array 310. These complex weights may be determined during a calibration process for wireless communication terminal 300. The calibration process may be conducted while an interfering signal is known to be present. For example, while another wireless communication terminal located in close physical proximity to wireless communication terminal 300 is transmitting, BSC 340 may steer a main beam of primary transmit/receive antenna array 310 to each of the predetermined different positions, and, for each position of the main beam of the primary transmit/receive antenna array 310, appropriate complex weights to be applied by receive modules 326(a)-326(n) may be determined to minimize the power in the signal output by RF combiner 330. These complex weights then may be stored by ICC 360 (e.g., in a table or similar data structure). Then, when wireless communication terminal 300 is operating in the receive mode, the BSC 340 may communicate an indication of the current position of a main beam of the primary transmit/receive antenna array 310 to ICC 360, and ICC 360 may set the appropriate complex weights to be applied by the receive modules 326(a)-(n) based on the current position of the main beam of the primary transmit/receive antenna array 310 as determined during the calibration process.

Additionally or alternatively, ICC 360 continually may update the weights to be applied by receive modules 326(a)-(n) in an effort to continually minimize the power in the signal output by RF combiner 330 as measured by power receiver 370. In such implementations, BSC 340 may be configured to steer a main beam of primary transmit/receive antenna array 310 to a predetermined number of different positions or, alternatively, the different positions to which BSC 340 can steer the main beam of primary transmit/receive antenna array 310 may not be predetermined. For example, BSC 340 may continually adjust the phase shifts to be applied by transmit/receive modules 312(a)-312(m) to steer the main beam of primary transmit/receive antenna array 310 to different positions perceived as favorable for transmitting a signal to and/or receiving a signal from one or more desired targets (e.g., satellites orbiting the earth).

In some implementations, wireless communications terminal 300 may be configured to receive a desired signal from two or more satellites orbiting the earth. In such implementations, primary transmit/receive antenna array 310 may be configured to produce multiple different main beams, each of which may be steered independently from the other(s). For example, primary transmit/receive antenna array 310 may be configured to produce a handoff beam and a traffic beam. The handoff beam continually may be scanned to identify and locate one or more satellites with which the wireless communication terminal 300 can communicate at a given time. If multiple satellites are available for communication with the wireless communication terminal 300, a preferred satellite for the wireless communication terminal 300 to communicate with may be determined based on, for example, signals received from the different satellites in the handoff beam. Meanwhile, the traffic beam may handle actual traffic (e.g., voice or data) and, when multiple satellites are available for wireless communication terminal 300 to communicate with, may be steered to positions perceived as being favorable for communicating with the preferred satellite. In such implementations, modem 355 may have two input ports, one for signals received in the handoff beam and the other for signals received in the traffic beam.

Furthermore, in some implementations, auxiliary receive antenna array 320 also may be configured to produce multiple different main beams that can be steered independently of each other, for example, a handoff beam and a traffic beam. In such implementations, the signal received in the handoff beam of auxiliary antenna array 320 may be used to mitigate interference in the signal received in the handoff beam of the primary transmit/receive antenna array 310 and the signal received in the traffic beam of auxiliary receive antenna array 320 may be used to mitigate interference in the signal received in the traffic beam of the primary transmit/receive antenna array 310, for example, according to the interference mitigation techniques described herein (e.g., by coordinating the steering of the beams of the primary transmit/receive antenna array 310 and the auxiliary receive antenna array 320.

In certain scenarios, steering a main beam of primary transmit/receive antenna array 310 to track a particular satellite may result in steering the main beam of primary transmit/receive antenna array 310 in a direction that causes the interfering signal to be received in the main beam of primary transmit/receive antenna array 310. In such scenarios, the auxiliary receive antenna array 320 may not be effective in mitigating interference in the primary transmit/receive antenna array 310. Thus, if wireless communication terminal 300 determines that steering a main beam of primary transmit/receive antenna array 310 to track a particular satellite will result in the interfering signal being received in the main beam of primary transmit/receive antenna array 310, wireless communication terminal 300 instead may steer the main beam of primary transmit/receive antenna array 310 to initiate communications with a different satellite.

In certain alternative implementations, the model of the interfering signal may be subtracted from the main signal at an intermediate frequency (e.g., a frequency that is lower than RF frequencies) instead of at RF. For example, in such implementations, the transmit/receive modules 316(a)-(m) may include circuitry (e.g., including a local oscillator) that converts the variants of the main signal received at RF to an intermediate frequency. After converting the variants of the main signal to the intermediate frequency, the transmit/receive modules 316(a)-(m) also may filter (e.g., using a bandpass filter) and/or amplify (e.g., using a low noise amplifier) the received signals. The intermediate frequency signals output by the transmit/receive modules 316(a)-(m) then may be transmitted to combiner 330 where they are combined at the intermediate frequency instead of at RF. Alternatively, in some implementations, the signals output by transmit/receive modules 316(a)-(m) may be output at RF and combined into an RF main signal that is converted to the intermediate frequency before being transmitted to combiner 330. The receive modules 326(a)-326(n) of the auxiliary receive antenna array 320 also may convert the variants of the secondary signal that they receive from RF to the intermediate frequency before the signals are combined by combiner 350. The resulting intermediate frequency model of the interfering signal then may be subtracted from the intermediate frequency main signal by combiner 330. Alternatively, the variants of the secondary signal received by antenna elements 324(a)-(n) may be combined at RF by combiner 350, and the combined signal then may be converted to the intermediate frequency before being subtracted from the main signal by combiner 330. In such alternative implementations, the complex weights applied to the variants of the secondary signal by the receive modules 326(a)-(n) may be determined to minimize the power measured in the signal that results from subtracting the intermediate frequency model of the interfering signal from the intermediate frequency main signal.

In still other alternative implementations, the variants of the main signal received by the primary antenna elements 312(a)-(m) may be converted to digital baseband before being combined. Similarly, the model of the interfering signal received in the side lobe(s) of the primary transmit/receive antenna array 310 also may be converted to digital baseband before being subtracted from the main signal. For example, in such implementations, the signals output by transmit/receive modules 316(a)-(m) (e.g., at RF or an intermediate frequency) may be converted to digital baseband (e.g., by modems or demodulators) before being combined into a digital baseband main signal. Alternatively, the signals output by transmit/receive modules 316(a)-(m) may be combined to generate a main signal (e.g., an RF or intermediate frequency main signal) that then is converted to a digital baseband main signal (e.g., by a modem or a demodulator). Similarly, the signals output by receive modules 326(a)-326(n) (e.g., at RF or an intermediate frequency) may be converted to digital baseband (e.g., by modems or demodulators) before being combined to generate a digital baseband model of the interfering signal that then may be subtracted from the digital baseband main signal. Alternatively, the signals output by receive modules 326(a)-(n) may be combined by combiner 350 to generate a model of the interfering signal that then is converted to digital baseband (e.g., by a modem or demodulator) and subtracted from the digital baseband main signal. In such alternative implementations, the complex weights applied to the variants of the secondary signal by the receive modules 326(a)-(n) may be determined to minimize the power measured in the signal that results from subtracting the digital baseband model of the interfering signal from the digital baseband main signal.

Figure 4:
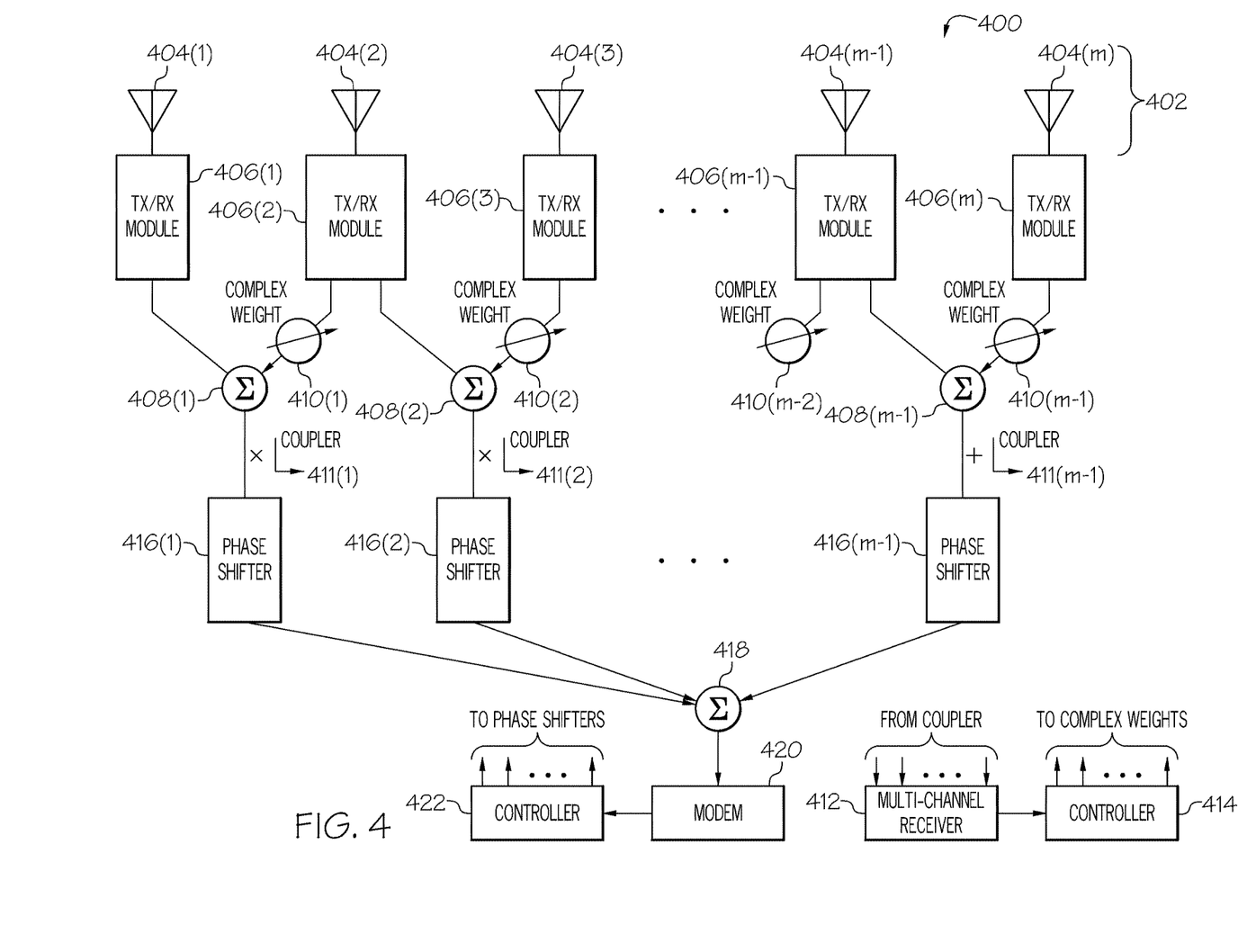
FIG. 4 is a block diagram of a system for wireless communication configured to provide interference mitigation.

With reference to FIG. 4, a block diagram of a wireless communication terminal 400 configured to provide interference mitigation is illustrated in accordance with a non-limiting implementation of the present disclosure. As illustrated in FIG. 4, wireless communication terminal 400 includes a multielement antenna 402 having m antenna elements 404(1)-404(m), where m is a number that reflects the number of antenna elements. In some implementations, the antenna elements 404(1)-404(m) may be arranged in a linear array. Additionally or alternatively, in some implementations the antenna elements 404(1)-404(m) may be arranged such that the displacement between each individual antenna element is substantially equal.

The antenna elements 404(1)-(m) each may be configured to transmit and/or receive signals. In addition, the multielement antenna 402 may be steerable, for example, to enable one or more main beams of the multielement antenna 402 to be steered in directions that are favorable for transmitting and/or receiving signals and/or to enable one or more nulls of the multielement antenna 402 to be steered in desirable directions (e.g., in the direction of a source of interference). For example, if wireless communication terminal 400 is configured to communicate with one or more satellites while being collocated with a potential source of interference (e.g., another communications terminal that uses similar, adjacent, neighboring, and/or overlapping frequencies (e.g., for transmit and/or receive functions of satellite communication)), the multielement antenna 402 may be steerable to train a main beam of the multielement antenna 402 in directions favorable for communicating with a target satellite while also steering a null in the direction of the potential source of interference.

As illustrated in FIG. 4, in some implementations, individual antenna elements 404(1)-404(m) may include transmit/receive modules 406(1)-406(m). Such transmit/receive modules 406(1)-406(m) may include bandpass filters, low noise amplifiers, transmit power amplifiers, RF switches (e.g., for switching from transmit to receive mode and vice versa), and/or other components configured to facilitate the transmission and/or reception of signals. In addition, individual antenna elements 404 may be paired with adjacent antenna elements 404 such that the outputs of the transmit/receive modules 406 of each such pair of antenna elements are combined by one of a plurality of signal combiners 408(1)-408(m−1). In this manner, one antenna element 404 of each such pair of antenna elements may be configured to receive an interfering signal (e.g., from a collocated communications terminal or other interference source) such that the interfering signal, or a model of the interfering signal, may be subtracted from the signal received by the other antenna element 404 of the pair by the corresponding signal combiner 408 in order to reduce the output level of, or otherwise mitigate, the interference in the signal output by the pair of antenna elements at the signal combiner 408. More particularly, as illustrated in FIG. 4, a phase shifter or other component 410(1)-410(m−1) may be configured to apply a complex weight (e.g., with a real and an imaginary component either of which may be zero) to the output from the transmit/receive module 406 of one antenna element 404 of each pair of antenna elements (e.g., to shift the amplitude and/or phase of the output signal) before it is combined with the output of the transmit/receive module 406 of the other antenna element 404 of the pair.

In some implementations, a multi-channel receiver 412 may receive the interference-mitigated signals output by signal combiners 408(1)-408(m−1) (e.g., from signal couplers 411(1)-411(m−1) that tap the outputs of signal combiners 408(1)-408(m−1)) and measure the power in each such interference-mitigated signal. Based on feedback received from the multi-channel receiver 412 about the power level of each such interference-mitigated signal, a controller 414 may control the complex weights applied by components 410(1)-410(m−1) in an effort to minimize the power measured in the interference-mitigated signals output by the signal combiners 408(1)-408(m−1) in order to eliminate or reduce the interference present in the interference-mitigated signals output by signal combiners 408(1)-408(m−1).

As further illustrated in FIG. 4, in some implementations, phase shifters 416(1)-416(m−1) may apply complex weights (e.g., with real and imaginary components either of which may be zero) to, or otherwise shift the phase of, the corresponding outputs of signal combiners 408(1)-408(m−1) which then are combined into a single, interference-mitigated output signal from the multielement antenna 402 by signal combiner 418. The application of complex weights by phase shifters 416(1)-416(m−1) to the outputs of signal combiners 4081(1)-408(m−1) in this fashion may enable one or more main beams of the multielement antenna 402 to be steered in directions that are favorable for transmitting and/or receiving signals.

The output of signal combiner 418 may be passed to a modem 420 for additional processing. In addition, in some implementations, the modem 420 may pass the output signal, or information about the output signal, to a controller 422 that controls the complex weights and/or phase shifts applied by phase shifters 416(1)-416(m−1) to steer one or more main beams of the multielement antenna 402 in directions that are favorable for transmitting and/or receiving signals (e.g., based on characteristics of the output signal and/or a priori knowledge of the location of an intended transmitter of signals to be received by the multielement antenna 402). In some implementations, controllers 414 and 422 may be implemented as separate and discrete components. In alternative implementations, controllers 414 and 422 may be implemented as a single component. Additionally or alternatively, in some implementations, the signals received by antenna elements 404(1)-404(m), output by transmit/receive modules 406(1)-406(m), received and output by signal combiners 408(1)-408(m−1), and output by phase shifters 416(1)-416(m−1) all may be RF signals.

Application of the teachings of the present disclosure may enable the simultaneous operation of two or more wireless communication terminals located in close physical proximity to one another even if the wireless communication terminals transmit and/or receive using similar, adjacent, neighboring, and/or overlapping frequencies. For example, application of the teachings of the present disclosure may enable an IRIDIUM® satellite communication terminal to be operated in the presence of a nearby active INMARSAT® satellite communication terminal.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The interference mitigation techniques described herein may be employed in a wide variety of different contexts to enable concurrent operation of two or more co-located wireless communication terminals. For example, the interference mitigation techniques described herein may be employed to enable concurrent operation of two satellite communication terminals mounted within a short distance of one another on a ship or aircraft. Similarly, the interference mitigation techniques described herein may be employed to enable concurrent operation of two terminals (e.g., transceivers) on a single satellite.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A wireless communications terminal comprising:
an antenna array having a plurality of m antenna elements arranged linearly and displaced from one another such that the displacement between each pair of adjacent antenna elements within the antenna array is substantially equal, wherein m is a number representing the plurality of antenna elements;
a first plurality of m−1 phase shifters, wherein each phase shifter of the first plurality is coupled to a unique one of the antenna elements and is configured to receive, from the antenna element to which it is coupled, a signal received by the antenna element and to apply a complex weight to it to generate a complex-weighted version of the signal received by the antenna element;
a plurality of m−1 first-stage signal combiners, wherein each first-stage signal combiner corresponds to a unique one of the pairs of adjacent antenna elements within the antenna array, is coupled to a first one of the pair of adjacent antenna elements and a phase shifter from the first plurality of phase shifters that is coupled to the second of the pair of adjacent antenna elements, and is configured to:
 receive, from the first of the pair of adjacent antenna elements, a signal received by the first antenna element,
 receive, from the phase shifter coupled to the second of the pair of adjacent antenna elements, the complex-weighted version of the signal received by the second antenna element, and
 combine the signal received by the first antenna element and the complex-weighted version of the signal received by the second antenna element to generate an output signal;
a second plurality of m−1 phase shifters, wherein each phase shifter of the second plurality is coupled to a unique one of the first-stage signal combiners and is configured to receive, from the first-stage signal combiner to which it is coupled, the output signal output by the first-stage signal combiner and to apply a complex weight to it to generate a complex-weighted version of the output signal;
a second-stage signal combiner coupled to each of the phase shifters of the second plurality and configured to combine the complex-weighted versions of the output signals output by the phase shifters of the second plurality to generate an interference-mitigated output signal for the antenna array;

a first controller to set the complex weights applied by the first plurality of phase shifters to the signals received by the antenna elements to which they are connected to generate complex-weighted versions of the signals received by the antenna elements to which they are connected that model interference from a co-located wireless communication terminal; and a second controller to set the complex weights applied by the second plurality of phase shifters to steer a main beam of the antenna array to facilitate reception of a desired signal.

2. The wireless communications terminal of claim 1, wherein:

phase shifters of the first plurality of phase shifters are configured to apply complex weights to the signals they receive from the antenna elements to which they are coupled by applying complex weights that have both real and imaginary parts; and phase shifters of the second plurality of phase shifters are configured to apply complex weights to the signals they receive from the first-stage signal combiners to which they are coupled by applying complex weights that have both real and imaginary parts.

3. The wireless communications terminal of claim 2, wherein:

the phase shifters of the first plurality of phase shifters that are configured to apply complex weights to the signals they receive from the antenna elements to which they are coupled are configured to apply complex weights that can have real parts that are zero and imaginary parts that are zero; and the phase shifters of the second plurality of phase shifters that are configured to apply complex weights to the signals they receive from the first-stage signal combiners to which they are coupled are configured to apply complex weights that can have real parts that are zero and imaginary parts that are zero.

4. The wireless communications terminal of claim 1, wherein individual antenna elements include transmit/receive modules.

5. The wireless communications terminal of claim 1, wherein the antenna array is configured to transmit signals in addition to receiving signals and individual antenna elements are configured to transmit signals in addition to receiving signals.

6. The wireless communications terminal of claim 1, further comprising:

a multi-channel receiver configured to measure the power of the signals carried on its multiple channels and to transmit an output signal for the first controller that is indicative of the power of the signals measured by the multi-channel receiver; and a plurality of m−1 signal couplers, each signal coupler configured to couple the signal output by a unique one of the m−1 first-stage signal combiners to a corresponding unique channel of the multi-channel receiver, wherein:

the first controller is configured to set the complex weights applied by the first plurality of phase shifters to minimize the power of the signals measured by the multi-channel receiver.

7. The wireless communications terminal of claim 1, wherein the signals received by the antenna elements, the complex-weighted versions of the signals received by the antenna elements, the output signals generated by the first-stage signal combiners, the complex-weighted versions of the output signals, and the interference-mitigated output signal for the antenna array all are RF signals.

8. The wireless communications terminal of claim 1, wherein the first and second controllers are implemented as separate, individual controllers.

9. The wireless communications terminal of claim 1, wherein the first and second controllers are implemented to function together as a single controller.

10. The wireless communications terminal of claim 1, wherein the second controller is configured to set the complex weights applied by the second plurality of phase shifters to steer the main beam of the antenna array to facilitate reception of a desired signal from a satellite.

11. The wireless communications terminal of claim 1, wherein the wireless communications terminal is a wireless satellite communications terminal.

12. A method for processing a desired signal by a wireless communication terminal, comprising:

receiving signals with an antenna array having a plurality of m antenna elements arranged linearly and displaced from one another such that the displacement between each pair of adjacent antenna elements within the antenna array is substantially equal, wherein m is a number representing the plurality of antenna elements;

accessing a first set of complex weights to be applied to the signals received by m−1 of the antenna elements;

applying the first set of complex weights to the signals received by the m−1 antenna elements to generate complex-weighted versions of the corresponding signals received by the m−1 antenna elements;

for each pair of adjacent antenna elements within the antenna array, combining the signal received by a first one of the pair of adjacent antenna elements with the complex-weighted version of the signal received by the second one of the pair of adjacent antenna elements to generate m−1 output signals;

accessing a second set of complex weights to apply to the output signals;

applying the second set of complex weights to the output signals to generate complex-weighted versions of the output signals; and combining the complex-weighted versions of the output signals to generate an interference-mitigated output signal.

13. The method of claim 12, wherein accessing a first set of complex weights to be applied to the signals received by m−1 of the antenna elements comprises setting a first set of complex weights to be applied to the signals received by m−1 of the antenna elements to minimize the power in the m−1 output signals generated by combining, for each pair of adjacent antenna elements within the antenna array, the signal received by a first one of the pair of adjacent antenna elements with the complex-weighted version of the signal received by the second one of the pair of adjacent antenna elements.

14. The method of claim 12, wherein accessing a second set of complex weights comprises setting a second set of complex weights to steer a main beam of the antenna array to facilitate reception of a desired signal.

15. The method of claim 14, wherein setting the second set of complex weights to steer the main beam of the antenna array to facilitate reception of a desired signal comprises setting the second set of complex weights to steer the main beam of the antenna array to facilitate reception of a desired signal from a satellite.

16. A wireless communications terminal comprising:
- a multi-element antenna having a plurality of antenna elements;
- a plurality of preliminary signal combiners, each preliminary signal combiner configured to combine received signals output by a corresponding pair of two antenna elements, wherein:
  - the signal output by a first one of the pair of antenna elements provides a model of interference present in the received signal output by the second one of the pair of antenna elements, and
  - the preliminary signal combiner is configured to combine the signal output by the first antenna element with the signal output by the second antenna element to produce an initial interference-mitigated signal;
- a plurality of phase shifters configured to apply complex weights to corresponding interference-mitigated signals to produce complex-weighted versions of the corresponding interference-mitigated signals and effectively steer a main beam of the multi-element antenna to facilitate reception of a desired signal; and
- another signal combiner configured to combine the complex-weighted versions of the interference-mitigated signals to produce an interference-mitigated output signal.

17. The wireless communications terminal of claim 16, wherein the wireless communications terminal is a wireless satellite communications terminal.

18. The wireless communications terminal of claim 16, further comprising a controller to set the complex weights applied by the plurality of phase shifters to steer the main beam of the multi-element antenna array to facilitate reception of the desired signal.

19. The wireless communications terminal of claim 18, wherein the controller is configured to set the complex weights to facilitate reception of the desired signal from a satellite.

20. The wireless communications terminal of claim 16, wherein:
- the multi-element antenna having a plurality of antenna elements comprises a multi-element antenna array having a plurality of antenna elements arranged linearly; and
- the plurality of preliminary signals combiners are configured to combine received signals output by pairs of adjacent antenna elements within the antenna array.

* * * * *